(12) United States Patent
Silvers et al.

(10) Patent No.: US 8,814,423 B2
(45) Date of Patent: *Aug. 26, 2014

(54) HANDLE

(76) Inventors: Michael Henry Silvers, Ultimo (AU); Sam Tam, Ultimo (AU)

( * ) Notice: Subject to any disclaimer, the term of this patent is extended or adjusted under 35 U.S.C. 154(b) by 324 days.

This patent is subject to a terminal disclaimer.

(21) Appl. No.: 12/814,423

(22) Filed: Jun. 11, 2010

(65) Prior Publication Data
US 2011/0042497 A1 Feb. 24, 2011

Related U.S. Application Data

(63) Continuation-in-part of application No. 12/545,806, filed on Aug. 21, 2009, and a continuation-in-part of application No. 29/361,252, filed on May 7, 2010, now Pat. No. Des. 630,908.

(60) Provisional application No. 61/332,909, filed on May 10, 2010.

(51) Int. Cl.
| | |
|---|---|
| *B02C 18/00* | (2006.01) |
| *B01F 13/00* | (2006.01) |
| *A47G 21/02* | (2006.01) |
| *A47J 43/10* | (2006.01) |
| *A47J 19/00* | (2006.01) |
| *F25C 5/04* | (2006.01) |
| *A47J 43/28* | (2006.01) |

(52) U.S. Cl.
CPC ............... *A47G 21/023* (2013.01); *A47J 43/10* (2013.01); *A47J 19/005* (2013.01); *F25C 5/04* (2013.01); *A47J 43/288* (2013.01)
USPC ......... 366/342; D07/682; D07/683; 30/164.5; 30/164.6; 30/164.7; 30/164.8

(58) Field of Classification Search
USPC ................................ D07/682–683; 366/342; 30/164.5–164.8
See application file for complete search history.

(56) References Cited

U.S. PATENT DOCUMENTS

| 239,403 | A | * | 3/1881 | Stevens ........................ 30/164.6 |
|---|---|---|---|---|
| D27,270 | S | | 6/1897 | Baxter |
| 844,146 | A | | 2/1907 | Larkin |

(Continued)

FOREIGN PATENT DOCUMENTS

| DE | 10 2006 041 197 A1 | 3/2008 |
|---|---|---|
| FR | 331 902 A | 10/1903 |

OTHER PUBLICATIONS

European Search Report completed on Feb. 7, 2013 in The Hague for European Patent Application No. EP 10169802.5.

*Primary Examiner* — Walter D Griffin
*Assistant Examiner* — Christopher K Vandeusen
(74) *Attorney, Agent, or Firm* — Greenberg Traurig, LLP

(57) ABSTRACT

A muddler comprises an elongated member that ends in a head with spikes for crushing fruit pieces or other flavor ingredients. In a reverse mode, the muddler can be used as an ice crusher. Optional side located stirring ribs or formations may be provided to facilitate stirring. A handle comprises an elongated member that ends in a head with a tool interface or working face for performing kitchen or culinary work or work on wood, metal or the like. The head can be removed from the elongated member, and different heads in a set applied with the handle. There can be a finger grip portion at the top to facilitate handling and turning and manipulation.

10 Claims, 13 Drawing Sheets

(56) References Cited

U.S. PATENT DOCUMENTS

| | | | |
|---|---|---|---|
| 2,102,331 A | 12/1937 | Niles | |
| D143,028 S | 11/1945 | Reynolds | |
| D146,518 S | 3/1947 | Ramsthal | |
| D235,304 S * | 6/1975 | Greenberg | D7/682 |
| D240,389 S | 7/1976 | Merry | |
| 4,738,542 A | 4/1988 | Hung | |
| D304,894 S * | 12/1989 | Carlson | D7/682 |
| D339,964 S | 10/1993 | Knox | |
| 5,366,286 A * | 11/1994 | Ruttimann | 366/129 |
| D365,966 S | 1/1996 | Ancona | |
| D379,750 S | 6/1997 | Thompson et al. | |
| D381,554 S | 7/1997 | Tichenor | |
| D382,770 S | 8/1997 | Raoult | |
| 5,863,118 A | 1/1999 | Ackels et al. | |
| D414,986 S | 10/1999 | Mulhauser et al. | |
| 6,131,290 A | 10/2000 | Chiou | |
| D437,747 S * | 2/2001 | Kwok | D7/682 |
| D448,605 S | 10/2001 | Horan | |
| D461,680 S | 8/2002 | Kerr | |
| 6,454,455 B1 | 9/2002 | Jungvig | |
| D506,905 S * | 7/2005 | Lee | D7/682 |
| D519,315 S | 4/2006 | Coudurier | |
| D527,579 S | 9/2006 | Park | |
| D559,617 S | 1/2008 | Kloppsteck | |
| D567,023 S | 4/2008 | Baldieri | |
| D575,119 S * | 8/2008 | Peterson | D7/682 |
| D575,984 S | 9/2008 | Coppi | |
| D577,541 S | 9/2008 | Giannone | |
| D578,345 S | 10/2008 | Rae | |
| D578,824 S | 10/2008 | Munari et al. | |
| D578,825 S | 10/2008 | Bogani | |
| D579,265 S | 10/2008 | Munari | |
| D580,703 S | 11/2008 | Devries | |
| D584,104 S | 1/2009 | Munari | |
| D588,398 S | 3/2009 | Pan | |
| D590,206 S | 4/2009 | Munari | |
| D591,020 S | 4/2009 | Dotterman et al. | |
| D596,466 S * | 7/2009 | Blier et al. | D7/683 |
| D596,896 S | 7/2009 | Munari | |
| D606,806 S | 12/2009 | Campbell et al. | |
| D609,871 S | 2/2010 | Zach et al. | |
| 2007/0220710 A1 | 9/2007 | Hsieh | |

* cited by examiner

FIG. 6
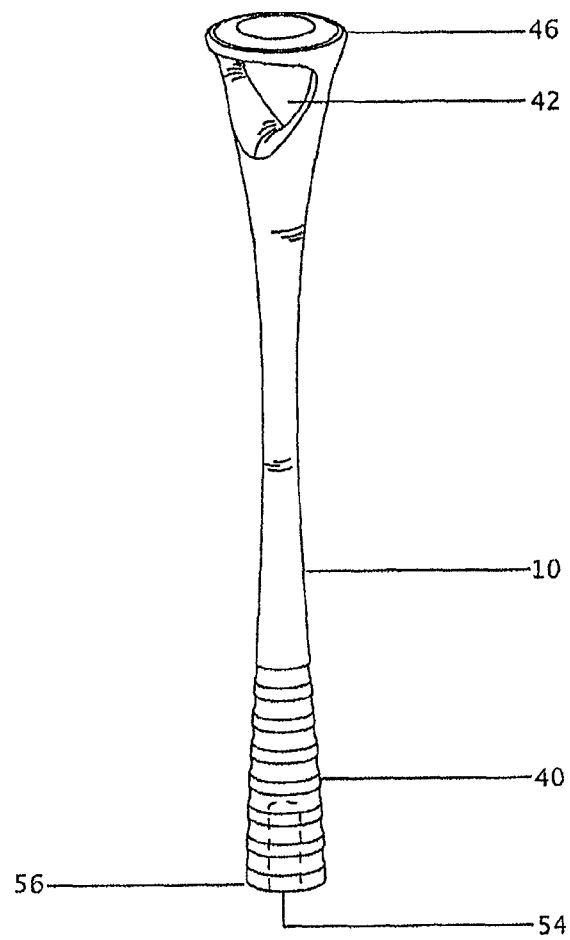
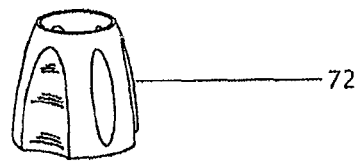
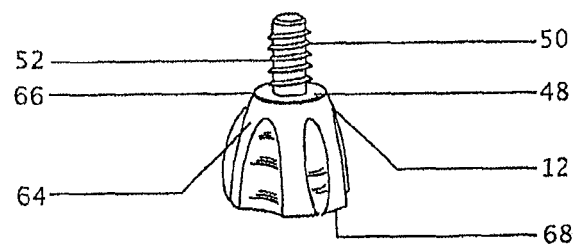

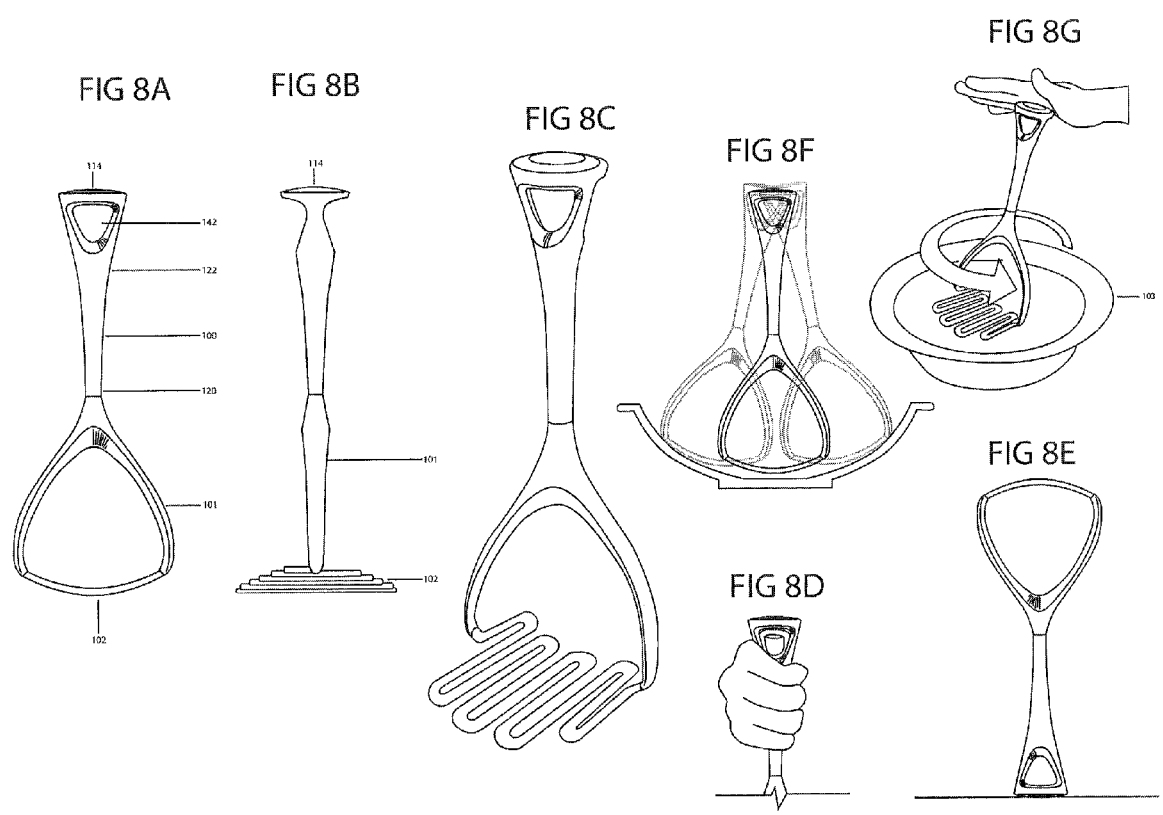

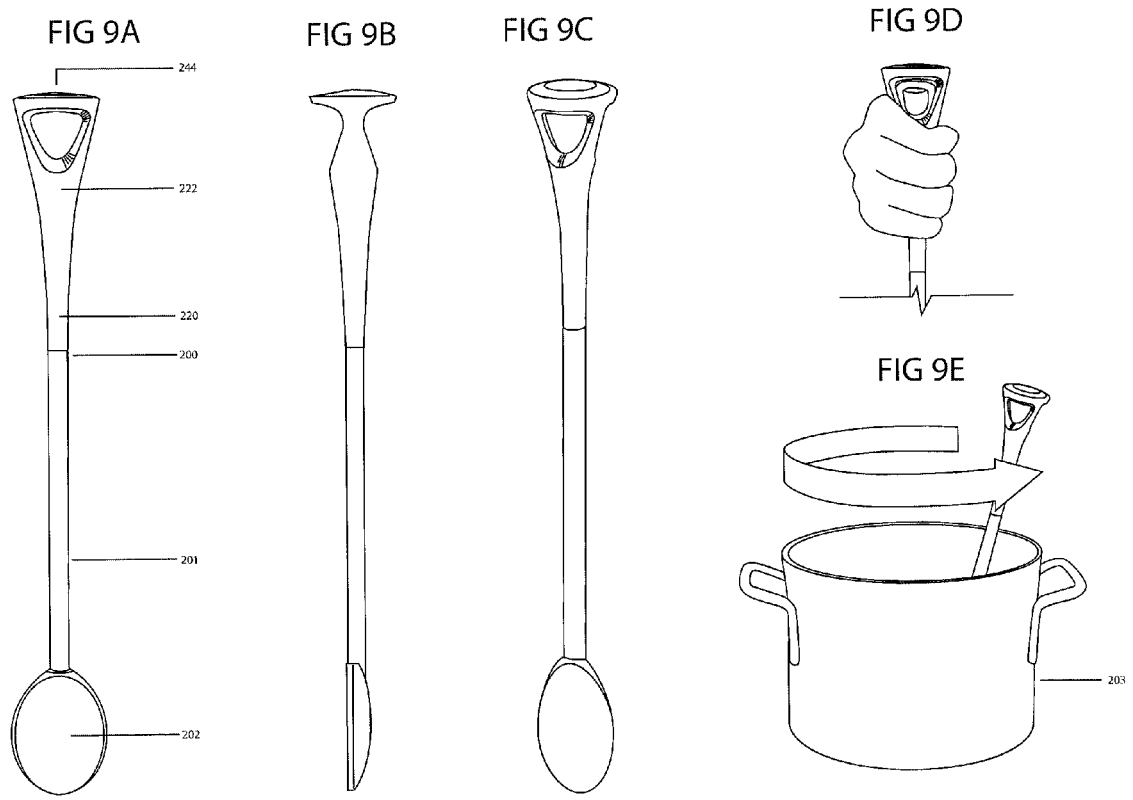

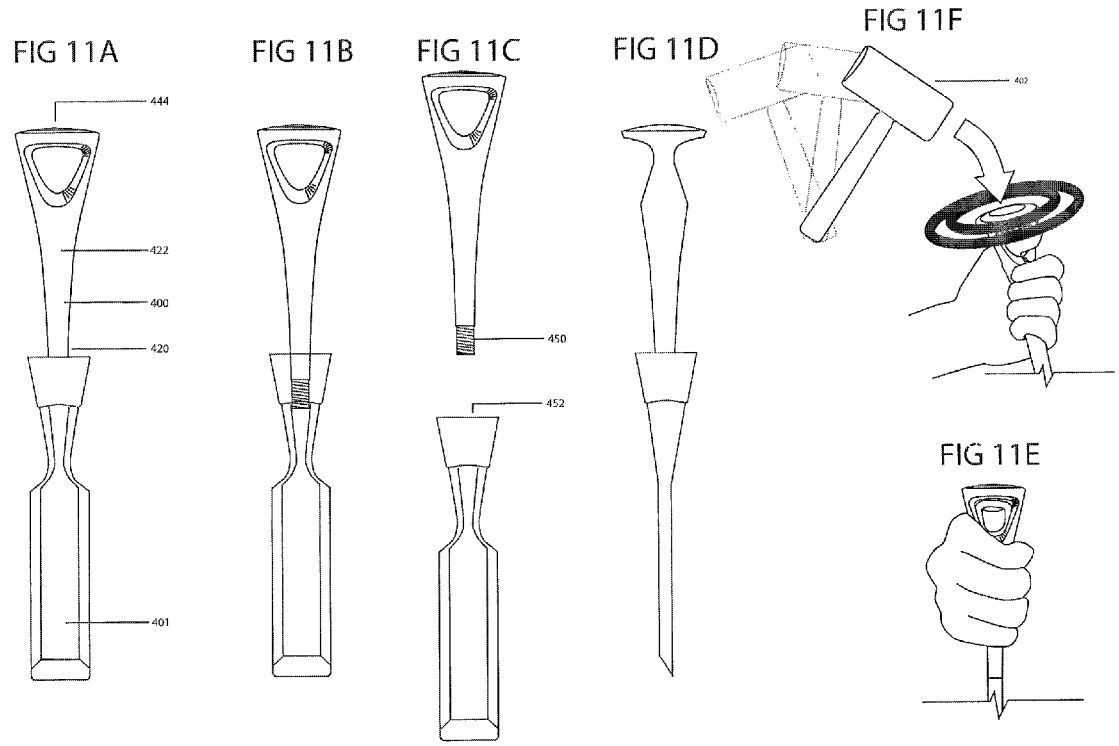

HANDLE

RELATED APPLICATIONS

This application is a Continuation-in-Part of U.S. patent application Ser. No. 12/545,806, filed Aug. 21, 2009; U.S. Design patent application Ser. No. 29/361,252, filed May 7, 2010; and U.S. Provisional Patent Application Ser. No. 61/332,909, filed May 10, 2010. This application also relates and claims priority to U.S. Design patent application Ser. No. 29/342,334, filed Aug. 21, 2009 and U.S. Design patent application Ser. No. 29/361,249, filed May 7, 2010, the contents of all of which are incorporated by reference herein in their entirety.

BACKGROUND

The disclosure pertains to a muddler and stirrer. Further the disclosure relates to a handle for tools such as kitchen tools, cutlery, other workshop hand tools and other implements that need to be manipulated and used manually.

A muddler is a bar tool that can be used to extract flavors from beverage ingredients such as citrus fruit pieces, by breaking them up or crushing them. A paddle-type stirrer is good for this purpose but a beverage. The muddler is effective for extracting flavor from fruit and for dispersing fruit pieces into a beverage, but does not serve particularly well as a stirrer, and there is a need to render the muddler more versatile than simply being an extraction device.

SUMMARY

The disclosure provides a muddler which operates more efficiently and also provides different functions. The device has the attributes of both a muddler and an ice crusher.

The hand tools in a kitchen environment can be potato mashers, ladles, spatulas, beaters, mixers and blenders. Other such implements can be bottle openers, cork screws and pulls. Additionally the handle can have use on pots and pans, and with knives, forks and spoons.

In a hand tool environment, the handle can have application on drills, screw drivers, hammers, pliers, spanners and cutters.

DRAWINGS

The above-mentioned features of the present disclosure will become more apparent with reference to the following description taken in conjunction with the accompanying drawings wherein like reference numerals denote like elements and in which:

FIG. 6 is a perspective view from the top of the muddler with parts separated.

FIGS. 8A to 8G are different views of a potato masher. The different aspects of the masher are shown in the drawings.

FIGS. 9A to 9E are different views of a spoon. The different aspects of the spoon are shown in the drawings.

FIGS. 11A to 11F are different views of a chisel. The different aspects of the chisel are shown in the drawings.

DETAILED DESCRIPTION

Figure 1:
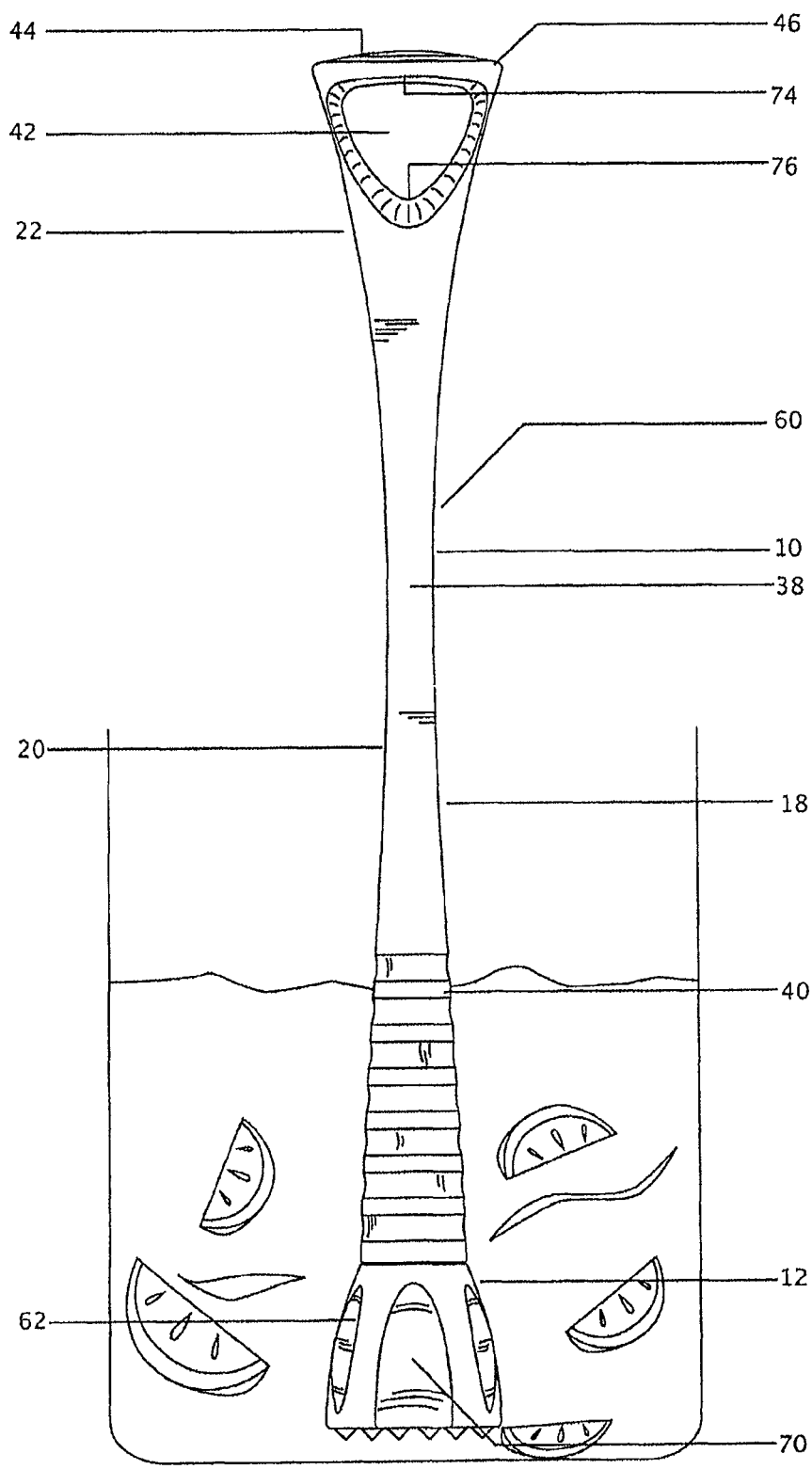
FIG. 1 is a first side view of the muddler of the present disclosure, illustrating the processing of fruit slices in a glass.
Figure 2:
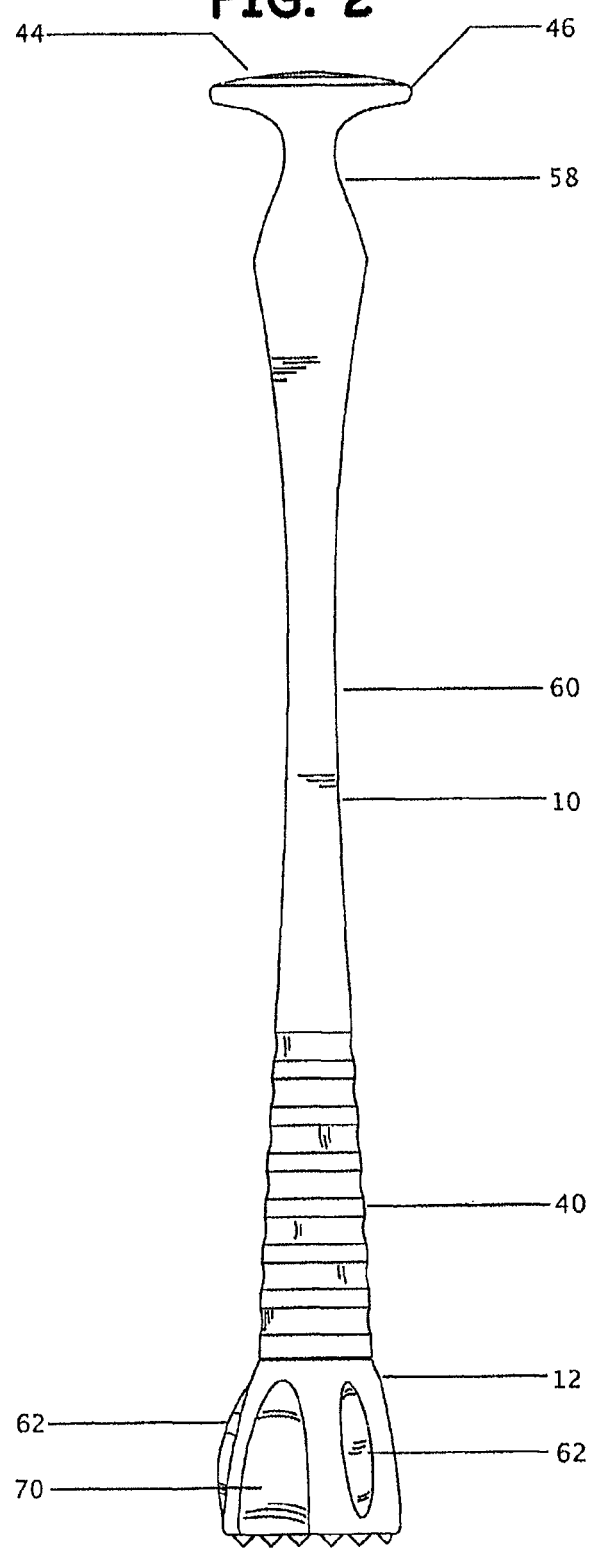
FIG. 2 is a second side view of the muddler of the present disclosure, the view being a 90 degree turn relative to FIG. 1.
Figure 3:
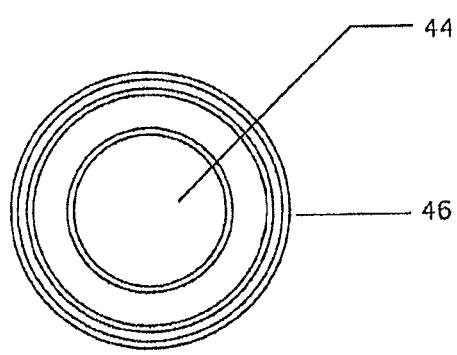
FIG. 3 is top view of the muddler.
Figure 4:
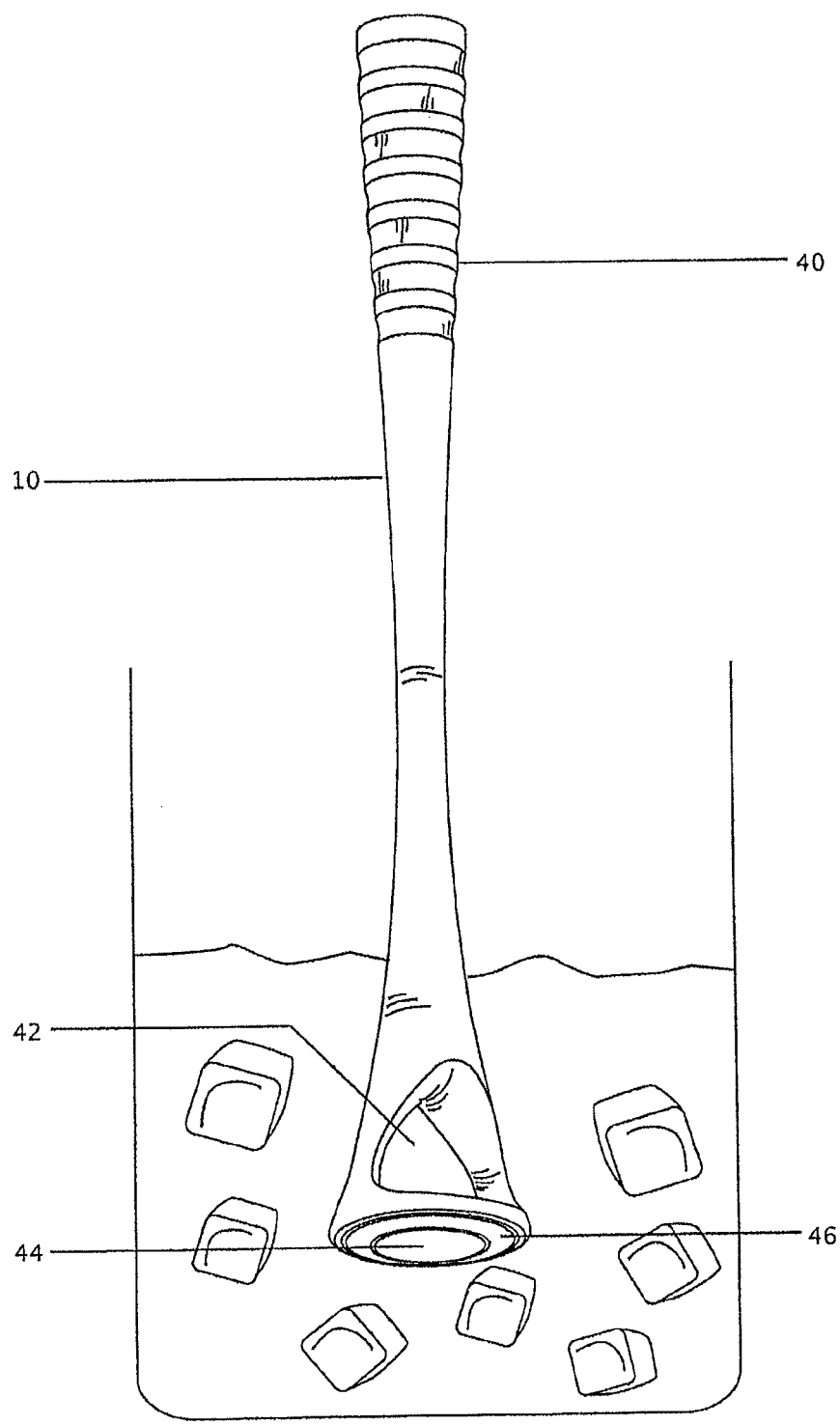
FIG. 4 is a second use of the muddler as an ice crusher, the perspective view being from the top of the muddler as inserted in a glass.
Figure 5:
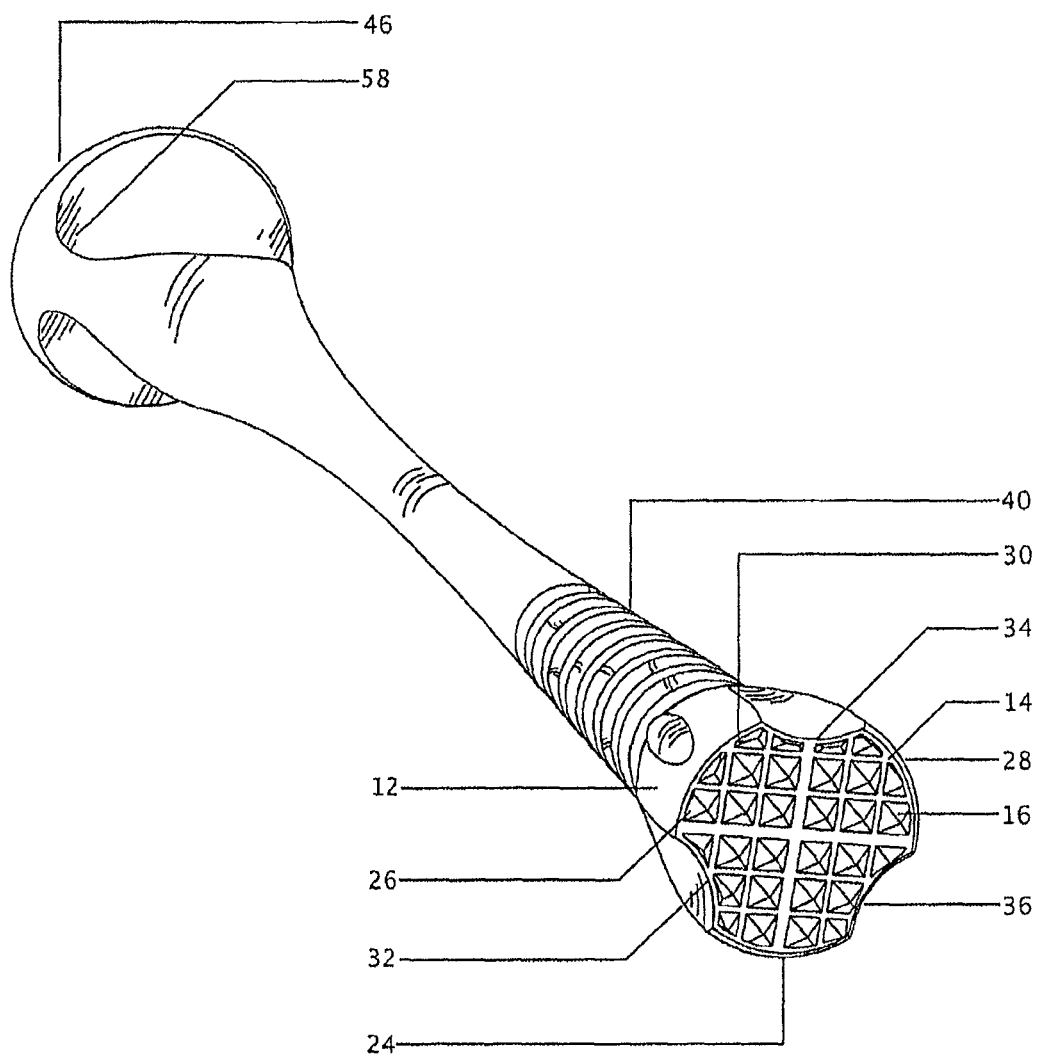
FIG. 5 is a perspective view from the bottom of the muddler.
Figure 7:
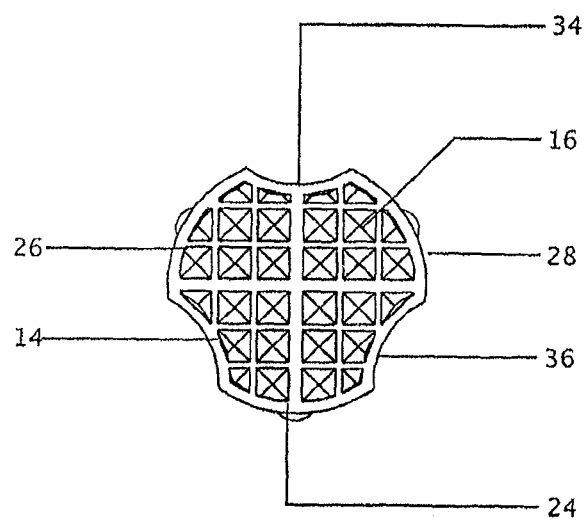
FIG. 7 is a view from the bottom of the muddler.
Figure 10A:
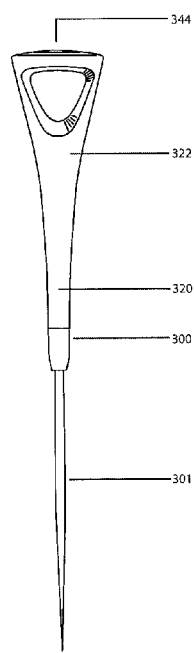
FIGS. 10A to 10F are different views of an ice pick. The different aspects of the ice pick are shown in the drawings.
Figure 10B:
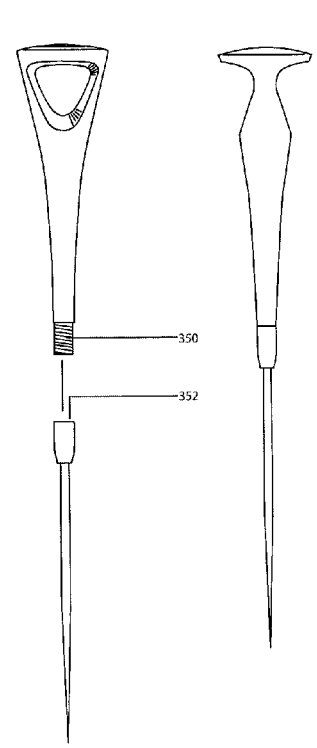
Figure 10C:
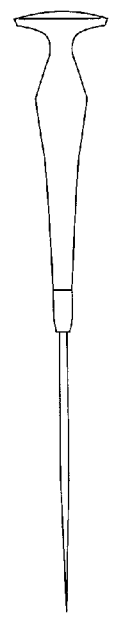
Figure 10D:
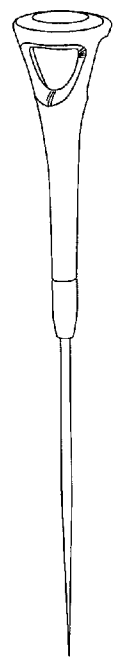
Figure 10E:
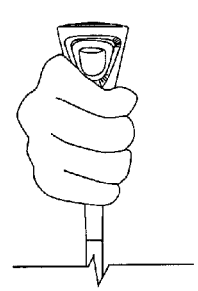
Figure 10F:
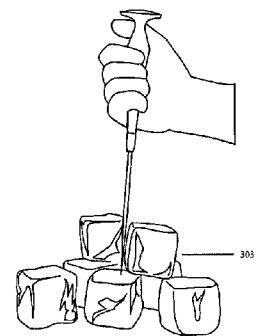
Figure 12A:
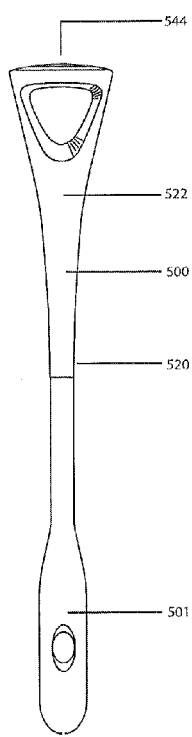
FIGS. 12A to 12D are different views of a spanner. The different aspects of the spanner are shown in the drawings.
Figure 12B:
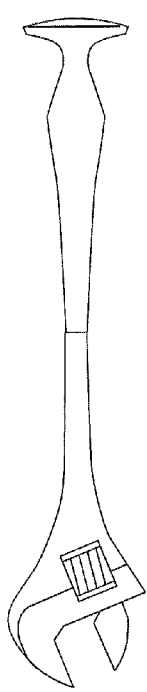
Figure 12C:
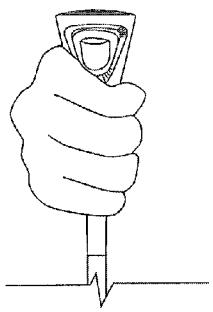
Figure 12D:
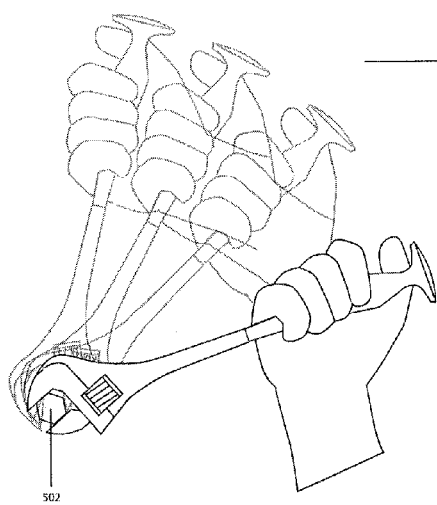

A combination muddler and ice crusher comprises an elongated member terminating in a head; and at a location towards a top of the muddler. The muddler action is with the head operational downwardly, and the ice crusher action being in reverse when the top is located downwardly. Towards the top there is an aperture or formation to facilitate accommodating a finger or thumb of a user. This permit enhanced action of the muddler. The top area is an ice crusher when the top is located in engagement with ice.

There is provided an elongated element elongated member 10 that terminates in a screw connected and removable head 12. The head 12 has a lower surface 14 from which extends a plurality of projections 16, which extend from the surface 14 of the head 12, namely at the bottom of the elongated member 10. The projections 16 are spikes, and they are arranged in a particular pattern on the bottom surface 14.

The elongated member 10 has an exterior concave type surface that is, in part, relatively flatter at 20 and in other part relatively more curved at 22, and ends at a handle at the top which is relatively outwardly flared compared to the narrower portion of the shaft 10.

A device comprises an elongated member 10 that is adapted to act as a muddler and an ice crusher. The head 12 has three lobes 24, 26 and 28 arranged equilaterally around the longitudinal axis of the elongated member 10. The outside perimeter 30 of the lobes 24, 26, and 28 is such that there are outwardly curved portions 24, 26 and 28 and between those portions inwardly ducted portions 32, 34, and 36. There can be any number of shapes for the head perimeter 30.

The central axis 38 of the elongated member 10 passes through the head 12 substantially at right angles to the surface 14. The surface 14 of the head 12 has projections 16 that extend from it. These projections 16 are small spikes that can assist with breaking apart a fruit such as a slice of citrus fruit commonly found in beverages such as cocktails. The number of projections or spikes 16 from the surface 14 can vary according to the desired use of the muddler. In some circumstances there can be many more than shown in the drawings. The drawings are only illustrative, and the size and shape of the projections can vary. The surface 14 is provided in some circumstances as part of a removable plate element 114, which has peripheral grooves, lips or the like to so the plate 114 can removable fit on the base of the head 12.

The device 10 can be long enough to extend past the rim of a drinking glass when the head 12 is resting on the bottom of the glass. The surface area of the head 12 is designed such that reciprocating the device vertically and/or transversely or a combination of movements creates a stirring or mixing effect in the glass.

This stirring effect can be enhanced by providing the device 10 with stirring ribs 40. The stirring ribs 40 may be one or more in number and can be evenly spaced around the circumference of the elongated member 10. The ribs 40 extend between the head 12 and at least a lower portion 18 of the elongated member 10. As such, the rotary stirring action of the device is enhanced, and can be turned between the fingers and not just reciprocated vertically.

There is an aperture 42 in the top of the elongated member 10 for locating a finger or thumb. The action the muddler by hand action can be enhanced and more positively transmitted to the muddler through this ability to grip the muddler more positively. The shape of the muddler shaft 10 also facilitates the positive action. At the top face 44 of the shaft there is an indentation 46 for locating the ball of the thumb.

The top end 48 of the head 12 is screw connected with the elongated member 10. The end 48 of the head 12 has a central shaft 50 with screw threads 52 to connect with an internal bore 54 at the end 56 of the elongated shaft 10 and along the axis 38. Different forms of connection are possible as an alternative to the screw connection.

The underside surface 14 of the head 12 shows an arrangement of spikes or projections 16. It is understood that this particular pattern represents only an example and not a limiting feature of the disclosure. The external spike surface 16 of the elongated member 10 may be polyhedral, in this example, relatively on a square base.

The elongated member 10 varies in cross section from the upper surface of the head 12 to a location adjacent to the upper end 44 of the device. The upper end 44 of the elongated member 10 is round in cross section and has a central indentation 46. Below the circular top surface 44, the elongated member 10 has an undercut waist 58 when considered from one side view where the aperture 42 is formed for the finger. When considered, viewed around its axis 38, the side wall surface 60 of the elongated member 10 gradually curves inwardly between the areas 20 and 22 so that the narrowest part of the overall shaft is about midway along the overall length of the elongated member 10. The waist 58 where the finger grip is at the top of the muddler may be narrower, when viewed or considered from one side view.

The trilobal hole in the handle allows the handle of any applicable device requiring certain hand motions to be effectively used as a comfortable effective too using the fingers or part of the hand. Each of the sides of the trilobal structure provides a curved interface and thus is no a straight line. As such enhances comfort, and each intersection of the sides has a rounded corner. Similarly from the outer face of the shaft towards the central axis of the shaft there is a slope towards the central axis, such that the smallest part of the hole is at the central axis and the larger parts of the hole are at the outer extremities. The upper end 44 is relatively larger in overall diameter than the shaft diameter, and is sized in diameter to provide an effective and comfortable location with the palm of a hand.

There are a series of outwardly extending extraction ribs or lobes 62 which are relatively elliptically formed and circumferentially spaced ribs that extend on the outer surface 64 of the head 12 almost to the top edge 66 of the head 12 and also to the lower surface interface at 68. The ribs 62 also present an undulated perimeter to allow for fruit to move to either side of the head 12. These ribs 62 allow juice and oils of the fruit to be extracted on the side of the muddler head 12. This is in addition to the muddling occurring with the surface 14.

Along the side wall surface 64 of the head 12 there are circumferentially spaced indented formations, lobes or ribs 70 positioned on the surface 64. These formations or ribs 70 are indentations alternating circumferentially with the protrusion ribs 62 on the outer surface 64 of the head 12. The concave elliptical cuts outs 70 assist in eliminating suctions and drag when the fruit is being crushed and muddled. Different amounts of the side formations or ribs 70 and ribs 62 can be provided.

When the head 12 is removed, and the muddler 10 is turned upside down, the portion 44 that is normally the area for locating the thumb is used for breaking or crushing ice. The outside surface on the shaft being the elongated member 10, with the spaced transverse ribs 40 facilitates non-slip handling by the hand or fingers when the device is used for ice crushing.

In some cases there can be a cover member or shawl 72 for the head 12.

While the present disclosure has been disclosed with reference to particular details of construction, these should be understood as having been provided by way of example and not as limitations to the scope or spirit of the disclosure. In particular, the precise cross sectional shape of the elongated member 10 can be varied. The external configuration may be determined by any number of factors both aesthetic and functional. The centrally narrower or thinner part of the shaft 10 facilitates the operation of the muddler. The shape of the aperture 42 towards the top of the shaft 10 for accommodating a finger can be varied. As shown the shape is essentially triangular, with the flat 74 of the essentially triangular opening being adjacent the top 44 of the device 10 and to the other sides tapering to an apex 76 at a location removed from the top 44.

As shown in FIGS. 8A to 8G relate to a potato masher. The different aspects of the masher is that there are arms 101 extending from the elongated member 100 which has a relatively curved portion 122 above a relatively flat portion 120. There are masher arms 101 connected to the flatter portion 120 of the elongated member 100, and the arms 101 have a masher head 102 which mashes potatoes or other food products in a bowl 103. The masher arms 10 may be made of nylon with a polished aluminum masher head 102. The elongated member 100 may be made of anti-slip material.

As shown in FIGS. 9A to 9E the spoon. The different aspects of the spoon are that there is an elongated member 200 which has a relatively curved portion 222 above a relatively flat portion 220. The extension spoon arm 201 is connected to the flatter portion 220 of the elongated member 200, and the extension spoon arm 201 has a spoon or ladle head 202 for mixing and lifting food products in a bowl 203. The upper part of the elongated member 200, being parts 222 and 220 and the extension arm 201 may be made of different materials to each other.

As shown in FIGS. 10A to 10F the ice pick. The different aspects of the ice pick are that there is an elongated member 300 which has a relatively curved portion 322 above a relatively flat portion 320. The ice pick 301 is connected to the flatter portion 320 of the elongated member 300, and the pick 201 has a sharp point for breaking ice 303. The upper part of the elongated member 300, being parts 322 and 320 and the pick 301 may be made of different materials to each other. The pick 301 may be threadingly engaged with the upper portion 320 through threads 350 engaging a receiving threaded aperture 352. As such replaceable picks or other devices can be attached to the member 300.

As shown in FIGS. 11A to 11F are different views of a chisel. The different aspects of the chisel are that there is an elongated member 400 which has a relatively curved portion 422 above a relatively flat portion 420. The chisel 401 is connected to the flatter portion 420 of the elongated member 400, and the chisel 401 has a sharp blade for working a surface when hammered with a mallet 402. The upper part of the elongated member 400, being parts 422 and 420 and the chisel 401 may be made of different materials to each other. The chisel blade portion 401 may be threadingly engaged with the upper portion 420 through threads 450 engaging a receiving threaded aperture 452. As such replaceable chisels or other devices can be attached to the member 400.

As shown in FIGS. 12A to 12D are different views of a spanner. The different aspects of the spanner are that there is an elongated member 500 which has a relatively curved portion 522 above a relatively flat portion 520. The spanner 501 is connected to the flatter portion 520 of the elongated member 500, and the spanner 501 has engaging faces for gripping a bolt 502. The upper part of the elongated member 500, being parts 522 and 520 and the pick 501 may be made of different materials to each other.

Figure 13A:
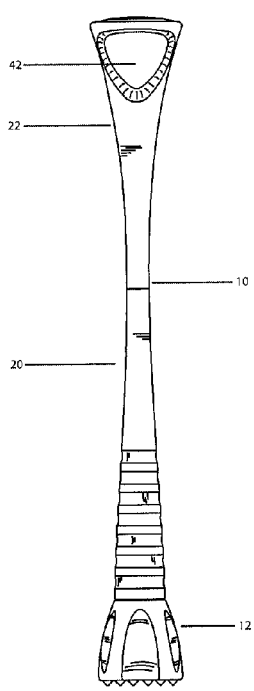
FIGS. 13A to 13C are different views of separable components of the handle. The different aspects of the spanner are shown in the drawings.
Figure 13B:
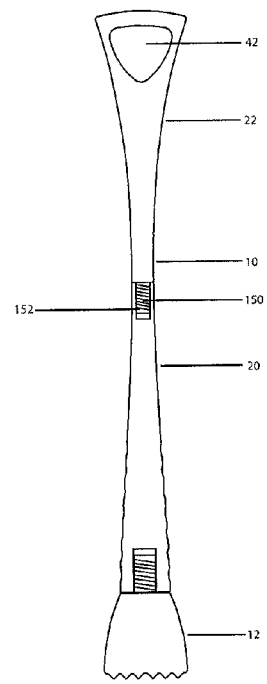
Figure 13C:
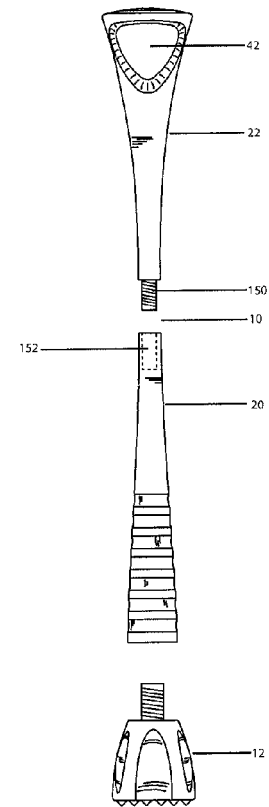

As shown in FIGS. 13A to 13C are different views of the separable components of the handle. The different aspects of the separable components are that that there is an elongated member 10 which has a relatively curved portion 22 above a relatively flat portion 20. The elongated member may be of multiple different components and the upper portion 301 may be threadingly engaged with the lower portion through threads 150 engaging a receiving threaded aperture 152. As such replaceable picks or other devices can be attached to the member 300. Different kinds of connectors can be used and some cases there can be a bayonet connector configuration or alternatively a force and variable friction fit engagement.

It will be understood that the shape of the exterior of the elongated member 10 may be regular, smooth or irregular in cross section, square, or otherwise curved or straight. Elongated shapes of this kind are easier to twirl than flat or paddle shapes.

The handle may be removable from the remainder of the tool, and in this sense there can be a threaded shank for engagement in a mating internally threaded aperture. Other forms of joinder of the handle shank with the leading and/or working edge/face of the tool are possible. The shank may be of different lengths to suit the tool being used. The hole may be of different sizes and shapes to facilitate the accommodation of the finger or part of the finger or thumb. The waist where the hole is can be of different degrees or shapes of inward pinching, to facilitate different sizes of hands, fingers and anatomical characteristics of a user and the tool itself. The hole is used for assisting in manipulation of the tool, and in that sense should be sufficiently large and/or sized to accommodate one or more parts of the hand anatomy of the user. In some cases the circumferential top may be formed in a shape that is not circumferential, but rather having one or more straight sides. Straight edges can facilitate manipulation and handling of the handle in a positive manner. In a further aspect the disclosure the handle may be a components fashioned with a suitable connector to engage any of multiple tools or implements. The length of the handle can vary as appropriate to be functionally effective with the tool. In some case the length of the handle can have an adjustable feature, such a screw threaded engagement or a pin and hole formation whereby its length can be adjusted as needed. Overall the functional features of the hole in the shank and the broad top provides for effective manipulation of the tool.

It will also be understood that the size, shape, number and even presence of extending projections on the underside of the head represent design choices over which there is a wide range of latitude. There can be various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for using an elongated member as a handle for a tool, the tool being selected from first and second tools being different tools in a set of tools for use interchangeably with the elongated member, the elongated member having at a top end an end face and terminating at an opposite end in a connector end, the connector end being for connection with the tool, the tool having at one end a working head being for interaction selectively with food, wood, metal, or other material that needs manipulation or working on, the elongated member and tool being separable and being connectable by an interconnection engagement system arranged respectively between and at the connector end of the elongated member and the end of the tool opposite the working head;

wherein the interconnection engagement system of the elongated member and the tool comprises an inter-engaging threaded shaft and mating threaded member each being positioned at one of the connector end of the elongated member or the end opposite the working head of the tool, respectively, and wherein the threaded shaft and mating threaded member are in superimposed engagement when the tool is connected to the elongated member at the connector end;

wherein at a location towards the top end of the elongated member there is an aperture for accommodating the thumb of a user, the aperture being integrated and formed permanently within the elongated member and being centrally located along a central axis of the elongated member, the central axis extending from the top end to the connector end of the elongated member, the aperture being sufficiently large to permit the passage of the thumb of the user through the aperture with the palm of the hand and fingers of the user positioned around the elongated member below the aperture;

wherein the elongated member further comprises an indentation towards the top end of the elongated member at the location around the aperture and adjacent to the top end face of the elongated member;

wherein the top end face of the elongated member further comprises a broadened surface having an outer diameter larger than the outer surface or diameter of the rest of the elongated member; and wherein the elongated member has an continuously inwardly tapered outer surface extending along the outer surface of the elongated member from and adjacent to the connector end to a midpoint of the elongated member;

the method comprising the steps of, in order:
a) selectively attaching a first tool of the tool set to the elongated member;
b) in a first operative sense, with the top end of the elongated member vertically above the working head of the tool, accommodating to either side of the aperture the thumb of the user when the thumb is passed through the aperture to apply a pressure down the central axis of the elongated member, or, in an alternative operative sense, with the top end of the elongated member vertically above the working head of the tool, locating the palm of the hand of a user on the broadened surface;
c) detaching the first tool from the elongated member;
d) after detaching the first tool, attaching a second tool by the same interconnection engagement system.

2. A method for using an elongated member as a handle for a tool, the tool being selected from first and second tools being different tools in a set of tools for use interchangeably with the elongated member, the elongated member having at a top end an end face and terminating at an opposite end in a connector end, the connector end being for connection with the tool, the tool having at one end a working head being for interaction selectively with food, wood, metal, or other material that needs manipulation or working on, the elongated member and tool being separable and being connectable by an interconnection engagement system arranged respectively between and at the connector end of the elongated member and the end of the tool opposite the working head;

wherein the interconnection engagement system of the elongated member and the tool comprises an inter-engaging threaded shaft and mating threaded member each being positioned at one of the connector end of the elongated member or the end opposite the working head of the tool, respectively, and wherein the threaded shaft and mating threaded member are in superimposed engagement when the tool is connected to the elongated member at the connector end;

wherein at a location towards the top end of the elongated member there is an aperture for accommodating the thumb of a user, the aperture being integrated and formed permanently within the elongated member and being centrally located along a central axis of the elongated member, the central axis extending from the top end to the connector end of the elongated member, the aperture being sufficiently large to permit the passage of the thumb of the user through the aperture with the palm of the hand and fingers of the user positioned around the elongated member below the aperture;

wherein the elongated member further comprises an indentation towards the top end of the elongated member at the location around the aperture and adjacent to the top end face of the elongated member; and wherein the top end face of the elongated member further comprises a broadened surface having an outer diameter larger than the outer surface or diameter of the rest of the elongated member;

the method comprising the steps of, in order:

a) selectively attaching a first tool of the tool set to the elongated member;

b) in a first operative sense, with the top end of the elongated member vertically above the working head of the tool, accommodating to either side of the aperture the thumb of the user when the thumb is passed through the aperture to apply a pressure down the central axis of the elongated member, or, in an alternative operative sense, with the top end of the elongated member vertically above the working head of the tool, locating the palm of the hand of a user on the broadened surface;

c) detaching the first tool from the elongated member;

d) after detaching the first tool, attaching a second tool by the same interconnection engagement system.

3. The method of claim 1 wherein the aperture is sized so that it has crosswise width at a part adjacent to the top end face and wherein the crosswise width is substantially parallel to the top end face, and wherein the broadened surface of the top end face extends to first width and wherein the crosswise width of the aperture adjacent to the top end face extends in length to greater than about 50% of the first width of the broadened surface of the top end face.

4. The method of claim 1 wherein the aperture is essentially triangular in shape, the triangular shape being defined as an apertured cross section extending as a hole through the elongated member from one side of the elongated member to an opposite side of the elongated member and being bounded on three sides of the triangle by the body of the elongated member, and the triangle shape extending with an apex pointing towards the connector end.

5. The method of claim 2 wherein the aperture is sized so that it has crosswise width at a part adjacent to the top end face and wherein the crosswise width is substantially parallel to the top end face, and wherein the broadened surface of the top end face extends to first width and wherein the crosswise width of the aperture adjacent to the top end face extends in length to greater than about 50% of the first, width of the broadened surface of the top end face.

6. The method of claim 2 wherein the aperture is essentially triangular in shape, the triangular shape being defined as an apertured cross section extending as a hole through the elongated member from one side of the elongated member to an opposite side of the elongated member and being bounded on three sides of the triangle by the body of the elongated member, and the triangle shape extending with an apex pointing towards the connector end.

7. The method of claim 1 wherein the aperture is sized so that it has crosswise width at a part adjacent to the top end face and wherein the crosswise width is substantially parallel to the top end face, and wherein the broadened surface of the top end face extends to first width and wherein the crosswise width of the aperture adjacent to the top end face extends in length to greater than about 50% of the first width of the broadened surface of the top end face wherein the aperture is essentially triangular in shape, the triangular shape being defined as an apertured cross section extending as a hole through the elongated member from one side of the elongated member to an opposite side of the elongated member and being bounded on three sides of the triangle by the body of the elongated member, and the triangle shape extending with an apex pointing towards the connector end.

8. The method of claim 2 wherein the aperture is sized so that it has crosswise width at a part adjacent to the top end face and wherein the crosswise width is substantially parallel to the top end face, and wherein the broadened surface of the top end face extends to first width and wherein the crosswise width of the aperture adjacent to the top end face extends in length to greater than about 50% of the first width of the broadened surface of the top end face wherein the aperture is essentially triangular in shape, the triangular shape being defined as an apertured cross section extending as a hole through the elongated member from one side of the elongated member to an opposite side of the elongated member and being bounded on three sides of the triangle by the body of the elongated member, and the triangle shape extending with an apex pointing towards the connector end.

9. The method of claim 1 wherein the elongated member is a solid member containing the aperture, such that the elongated member and tool form an assembled unit with the tool and elongated member being non-rotatably fixed to each other during step b).

10. A method for using an elongated member as a handle for a tool, the tool being selected from first and second tools being different tools in a set of tools for use interchangeably with the elongated member, the elongated member having at a top end an end face and terminating at an opposite end in a connector end, the connector end being for connection with the tool, the tool having at one end a working head being for interaction selectively with food, wood, metal, or other material that needs manipulation or working on, the elongated member and tool being separable and being connectable by an interconnection engagement system arranged respectively between and at the connector end of the elongated member and the end of the tool opposite the working head;

wherein the interconnection engagement system of the elongated member and the tool comprises an inter-engaging threaded shaft and mating threaded member each being positioned at one of the connector end of the elongated member or the end opposite the working head of the tool, respectively, and wherein the threaded shaft and mating threaded member are in superimposed engagement when the tool is connected to the elongated member at the connector end;

wherein at a location towards the top end of the elongated member there is an aperture for accommodating the thumb of a user, the aperture being integrated and formed permanently within the elongated member and being centrally located along a central axis of the elongated member, the central axis extending from the top end to the connector end of the elongated member, the aperture being sufficiently large to permit the passage of the thumb of the user through the aperture with the palm of the hand and fingers of the user positioned around the elongated member below the aperture;

wherein the elongated member further comprises an indentation towards the top end of the elongated member at the location around the aperture and adjacent to the top end face of the elongated member;

wherein the top end face of the elongated member further comprises a broadened surface having an outer diameter larger than the outer surface or diameter of the rest of the elongated member;

wherein the elongated member has an continuously inwardly tapered outer surface extending along the outer surface of the elongated member from and adjacent to the connector end to a midpoint of the elongated member;

wherein the aperture is sized so that it has a crosswise width at a part adjacent to the top end face and wherein the crosswise width is substantially parallel to the top end face, and wherein the broadened surface of the top end face extends to a first width and wherein the cross wise width of the aperture adjacent to the top end face extends in length to greater than about 50% of the first width of the broadened surface of the top end face;

wherein the aperture is essentially triangular in shape, the triangular shape being defined as an apertured cross section extending as a hole through the elongated member from one side of the elongated member to an opposite side of the elongated member and being bounded on three sides of the triangle by the body of the elongated member, and the triangle shape extending with an apex pointing towards the connector end; and the method comprising the steps of, in order:

a) selectively attaching a first tool of the tool set to the elongated member;

b) in a first operative sense, with the top end of the elongated member vertically above the working head of the tool, accommodating to either side of the aperture the thumb of the user when the thumb is passed through the aperture to apply a pressure down the central axis of the elongated member, or, in an alternative operative sense, with the top end of the elongated member vertically above the working head of the tool, locating the palm of the hand of a user on the broadened surface;

c) detaching the first tool from the elongated member;

d) after detaching the first tool, attaching a second tool by the same interconnection engagement system;

wherein the elongated member is a solid member containing the aperture, such that the elongated member and tool form an assembled unit with the tool and elongated member being non-rotatably fixed to each other during step b).

* * * * *